United States Patent
Miyajima et al.

(10) Patent No.: US 9,151,939 B2
(45) Date of Patent: Oct. 6, 2015

(54) ZOOM LENS AND IMAGE PICKUP APPARATUS EQUIPPED WITH SAME

(71) Applicants: Olympus Corporation, Tokyo (JP); Olympus Imaging Corp., Tokyo (JP)

(72) Inventors: Toru Miyajima, Tokyo (JP); Kazuya Nishimura, Tokyo (JP); Hiroshi Kodama, Tokyo (JP); Toshio Takahashi, Tokyo (JP)

(73) Assignees: OLYMPUS CORPORATION, Tokyo (JP); OLYMPUS IMAGING CORP., Tokyo (JP)

(*) Notice: Subject to any disclaimer, the term of this patent is extended or adjusted under 35 U.S.C. 154(b) by 0 days.

(21) Appl. No.: 14/502,560

(22) Filed: Sep. 30, 2014

(65) Prior Publication Data

US 2015/0015745 A1    Jan. 15, 2015

Related U.S. Application Data

(63) Continuation of application No. PCT/JP2014/054412, filed on Feb. 25, 2014.

(30) Foreign Application Priority Data

Mar. 5, 2013   (JP) .................. 2013-042803

(51) Int. Cl.
*G02B 15/20* (2006.01)
*G02B 15/22* (2006.01)
*G02B 9/60* (2006.01)
(Continued)

(52) U.S. Cl.
CPC .................. *G02B 15/20* (2013.01); *G02B 9/60* (2013.01); *G02B 15/16* (2013.01); *G02B 15/22* (2013.01); *H04N 5/23296* (2013.01)

(58) Field of Classification Search
CPC ........ G02B 15/16; G02B 15/20; G02B 15/22; G02B 9/60; H04N 5/23296
See application file for complete search history.

(56) References Cited

U.S. PATENT DOCUMENTS 6,807,015 B2    10/2004    Eguchi et al.
8,374,497 B2 *  2/2013    Nakamura ...................... 396/79
(Continued)

FOREIGN PATENT DOCUMENTS

JP    2001-281522    10/2001
JP    2003-215454    7/2003
(Continued)

OTHER PUBLICATIONS

International Search Report, dated May 20, 2014, issued in corresponding International Application No. PCT/JP2014/054412.

*Primary Examiner* — David N Spector
(74) *Attorney, Agent, or Firm* — Kenyon & Kenyon LLP

(57) ABSTRACT

There is provided a zoom lens in which the load on the driving system for wobbling operation can easily made low and an image pickup apparatus equipped with the same. A zoom lens in which each of distances between a plurality of lens units changes during zooming from the wide angle end to the telephoto end, includes a focus lens unit that shifts along an optical axis to effect focusing from infinity to a close distance and a plurality of wobbling lens units that wobble after a shift of the focus lens unit at an amplitude smaller than the shift of the focus lens unit in focusing operation, wherein a combination of the wobbling lens units caused to operate changes in the middle of the zooming from the wide angle end to the telephoto end.

22 Claims, 11 Drawing Sheets

(51) Int. Cl.
  *G02B 15/16* (2006.01)
  *H04N 5/232* (2006.01)

(56) References Cited

U.S. PATENT DOCUMENTS

| | | | |
|---|---|---|---|
| 8,711,489 B2* | 4/2014 | Kimata et al. | 359/683 |
| 8,873,160 B2* | 10/2014 | Hara | 359/684 |
| 8,994,842 B2* | 3/2015 | Takahashi et al. | 348/220.1 |
| 2012/0269500 A1* | 10/2012 | Nakamura | 396/80 |
| 2014/0185148 A1* | 7/2014 | Kimata et al. | 359/693 |
| 2014/0218808 A1* | 8/2014 | Ogata et al. | 359/695 |
| 2014/0347545 A1* | 11/2014 | Obikane | 348/345 |

FOREIGN PATENT DOCUMENTS

| | | |
|---|---|---|
| JP | 2007-093974 | 4/2007 |
| JP | 2007-240875 | 9/2007 |
| JP | 2007-293146 | 11/2007 |
| JP | 2012-225947 | 11/2012 |
| WO | 2011/024473 | 3/2011 |

\* cited by examiner

ZOOM LENS AND IMAGE PICKUP APPARATUS EQUIPPED WITH SAME

CROSS-REFERENCE TO RELATED APPLICATIONS

The present application is a continuation application of International application No. PCT/JP2014/054412 filed on Feb. 25, 2014, which is based upon and claims the benefit of priority from the prior Japanese Patent Application No. 2013-042803 filed on Mar. 5, 2013; the entire contents of these applications are incorporated herein by reference.

BACKGROUND OF THE INVENTION

1. Field of the Invention

The present invention relates to a zoom lens having a plurality of wobbling lens units and an image pickup apparatus equipped with such a zoom lens.

2. Description of the Related Art

A zoom lens having a wobbling lens unit has already been known. The wobbling lens unit is a lens unit which minutely oscillates (wobbles) at high speed along the direction of the optical axis to change the contrast of the image to an extent that is not recognizable in the reproduced image, and the focus state on the image pickup element is detected utilizing the oscillation (wobbling) of the wobbling unit.

For example, when an object is in focus, while the contrast of a formed image changes slightly with oscillation (wobbling) of the wobbling lens unit, the image shows substantially the same contrast at both ends of the wobbling range.

On the other hand, when the object shifts forward or backward to be out of focus, the image has different contrasts at both ends of the wobbling range. The object's going out of focus is detected from this change in the contrast, and the focus lens unit is shifted along the optical axis to bring the object into focus again. Thereafter, the wobbling lens unit is caused to oscillate minutely at high speed again to maintain the in-focus state.

The period of oscillation of the wobbling lens unit depends on the frame rate of the system including the image pickup element. Japanese Patent Application Laid-open Publication No. 2007-293146 describes a technique of changing the amplitude of oscillation of the wobbling lens unit in accordance with the zoom state to cause an appropriate change in contrast irrespective of the zoom state.

SUMMARY OF THE INVENTION

A zoom lens according to the present invention, which is a zoom lens in which each of distances between a plurality of lens units changes during zooming from the wide angle end to the telephoto end, including a focus lens unit that shifts along an optical axis to effect focusing from infinity to a close distance and a plurality of wobbling lens units that wobble after a shift of the focus lens unit at an amplitude smaller than the shift of the focus lens unit in focusing operation, wherein a combination of the wobbling lens units caused to operate changes in the middle of the zooming from the wide angle end to the telephoto end.

An image pickup apparatus according to the present invention includes a zoom lens and an image pickup element arranged on the image side of the zoom lens to generate an electrical signal based on an optical image formed by the zoom lens and the zoom lens is the above-described zoom lens.

BRIEF DESCRIPTION OF THE DRAWINGS

FIG. 1A shows the state at the wide angle end (W), FIG. 1B shows the state in an intermediate focal length state (S), and FIG. 1C shows the state at the telephoto end (T);

FIG. 7A shows the state at the wide angle end (W), FIG. 7B shows the state WS, FIG. 7C shows the state in an intermediate focal length state (S), FIG. 7D shows the state ST, and FIG. 7E shows the state at the telephoto end (T);

DETAILED DESCRIPTION OF THE INVENTION

In the following, embodiments of the zoom lens and the image pickup apparatus equipped with the same according to the present invention will be described in detail with reference to the drawings. The present invention is not limited by the embodiment.

First Embodiment

A zoom lens according to a first embodiment includes, in order from the object side to the image side (or the image pickup element side), a first lens unit G1 having a positive refractive power,
a second lens unit G2 having a negative refractive power,
a third lens unit G3 having a negative refractive power,
an aperture stop S,
a fourth lens unit G4 having a positive refractive power, and
a fifth lens unit G5 having a positive refractive power.

The zoom lens has a cover glass C for an image pickup element (such as CCD or C-MOS). The zoom lens forms an image on an image pickup surface I of the image pickup element.

In the zoom lens according to the first embodiment, the second lens unit G2 and the third lens unit G3 constitute a negative lens unit group.

The fourth lens unit G4 and the fifth lens unit G5 constitute a positive lens unit group.

In the zoom lens according to the first embodiment, during zooming from the wide angle end (FIG. 1A) to the telephoto end (FIG. 1C), the distance between the first lens unit G1 and the second lens unit G2 increases, the distance between the second lens unit G2 and the third lens unit G3 changes, the distance between the third lens unit G3 and the fourth lens unit G4 decreases, and the distance between the fourth lens unit G4 and the fifth lens unit G5 decreases. During zooming from the wide angle end (FIG. 1A) to an intermediate focal length state (FIG. 1B), and during zooming from the intermediate focal length state (FIG. 1B) to the telephoto end (FIG. 1C), the first lens unit G1, the second lens unit G2, the third lens unit G3, the aperture stop S, the fourth lens unit G4, and the fifth lens unit G5 all move toward the object side.

Focusing operation in the zoom lens according to the first embodiment is now described.

Focusing operation from infinity to a close distance is performed by shifting the third lens unit G3 (focus lens unit) toward the object side at any focal length state in the zoom range from the wide angle end to the telephoto end.

The distance between the second lens unit G2 and the third lens unit G3 increases in the telephoto range, so that a space for allowing the third lens unit G3 to shift for focusing is left.

Figure 2:
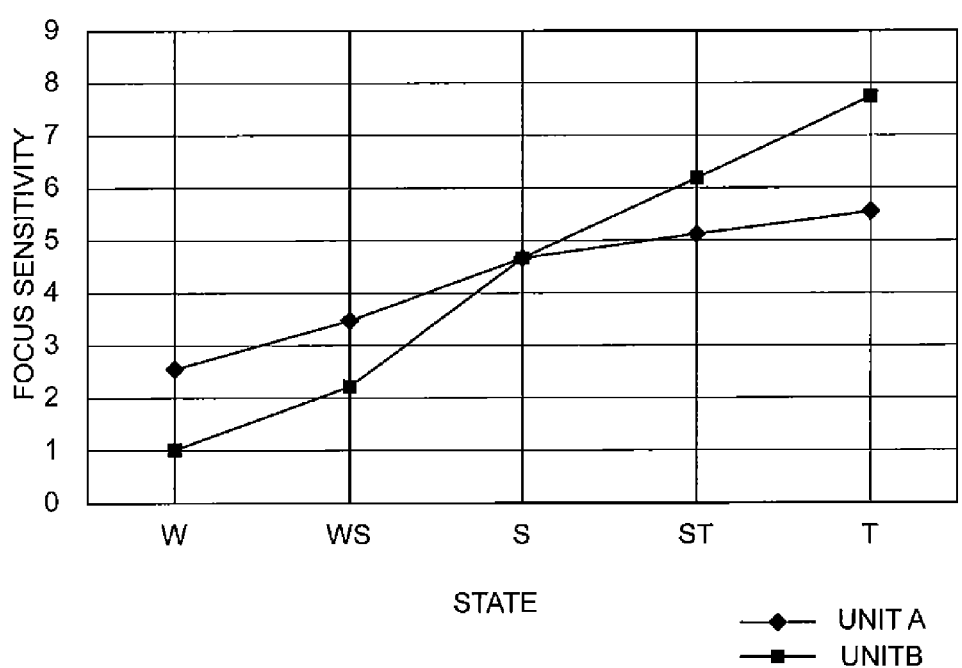
FIG. 2 is a graph showing changes in the focus sensitivity of a first wobbling lens unit A and a second wobbling lens unit B in the first embodiment.

Wobbling operation in the zoom lens according to the first embodiment will be described with reference to FIG. 2. FIG. 2 is a graph showing changes in the focus sensitivity of a first wobbling lens unit A and a second wobbling lens unit B in the first embodiment.

The zoom lens according to the first embodiment has two wobbling lens units. The wobbling lens units minutely oscillate at high speed after an object is brought into focus by the focus lens unit, thereby changing the contrast to a small extent. Changes in the contrast of an image formed on the image pickup surface are detected by a system including the image pickup element to determine the in-focus state and the out-of-focus state and to determine the moving direction of an object.

Moreover, the wobbling lens unit caused to operate is switched over at an intermediate focal length state.

In the focal length range from the wide angle end to the intermediate focal length state, the wobbling operation is performed by minutely oscillating an object side lens unit (which is the first wobbling lens unit A) in the fifth lens unit G5 at high speed along the direction of the optical axis.

In the focal length range from the intermediate focal length state to the telephoto end, the wobbling operation is performed by minutely oscillating the third lens unit G3 (which is the second wobbling lens unit B) at high speed along the direction of the optical axis.

In the zoom lens according to the first embodiment, each of the distances between the lens units (including the first through fifth lens units G1-G5) changes during zooming from the wide angle end to the telephoto end. The zoom lens includes a focus lens unit (the third lens unit G3) that shifts along the optical axis to effect focusing from infinity to a close distance. The zoom lens includes a plurality of wobbling lens units (the third lens unit G3 and the object side lens unit in the fifth lens unit G5) that wobble, after a shift of the focus lens unit, along the optical axis at an amplitude smaller than the shift of the focus lens unit in focusing operation. The combination of the wobbling lens units caused to operate changes in the middle of the zooming from the wide angle end to the telephoto end.

In this way, the zoom lens has a plurality of wobbling lens units, and the combination of the wobbling lens units caused to operate is changed in the middle of zooming. Thus, the wobbling operation is performed using a suitable lens unit for wobbling with change in the zoom state.

In the zoom lens according to the first embodiment, at least one wobbling lens unit (the third lens unit G3) among the plurality of wobbling lens units also serves as the focus lens unit (the third lens unit G3) that shifts along the optical axis during focusing from infinity to a close distance.

Using one lens unit for both wobbling and focusing leads to simplification of the driving unit.

Letting one of the plurality of wobbling lens units in the zoom lens according to the first embodiment be referred to as a first wobbling lens unit A (which is the object side lens unit in the fifth lens unit G5) and the other be referred to as a second wobbling lens unit B (which is the third lens unit G3). While at the wide angle end the first wobbling lens unit A (the object side lens unit in the fifth lens unit G5) wobbles, at the telephoto end the second wobbling lens unit B (the third lens unit G3) wobbles. In addition, the zoom lens according to the first embodiment satisfies the following conditional expressions (1) and (2):

$$|\alpha_{Aw}|/|\alpha_{Bw}| > 1 \quad (1), \text{ and}$$

$$|\alpha_{At}|/|\alpha_{Bt}| < 1 \quad (2)$$

where $\alpha_{Aw}$ is the focus sensitivity of the first wobbling lens unit A at infinity focus at the wide angle end, $\alpha_{Bw}$ is the focus sensitivity of the second wobbling lens unit B at infinity focus at the wide angle end, $\alpha_{At}$ is the focus sensitivity of the first wobbling lens unit A at infinity focus at the telephoto end, and $\alpha_{Bt}$ is the focus sensitivity of the second wobbling lens unit B at infinity focus at the telephoto end. The focus sensitivity $\alpha$ of the subject wobbling lens unit at infinity focus at the wide angle end and at the telephoto end is expressed by the following equation:

$$\alpha = (1 - \beta_{wob}^2) \times \beta_r^2,$$

where $\beta_{wob}$ is the lateral magnification of the subject wobbling lens unit, and $\beta_r$ is the lateral magnification of the overall optical system on the image side of the subject wobbling lens unit.

The focus sensitivity is a value representing the magnification of a change in the in-focus position of an object at infinity on the optical axis caused by a minute unit shift of the wobbling lens unit A or B. The larger this value is, the larger the change in focus caused by a minute shift of the wobbling lens unit is.

In the zoom lens according to the first embodiment, in which the third lens unit G3 and the object side lens unit in the fifth lens unit G5 serve as wobbling lens units, the relationship of the magnitudes of their focus sensitivities are reverse between the wide angle end and the telephoto end. Therefore, the amplitude of oscillation of the wobbling lens unit can be made small by wobbling the lens unit having the higher focus sensitivity at each of the wide angle end and the telephoto end. This makes the power consumption smaller.

This is also advantageous for achieving both reduction of the frame rate and power saving.

In the zoom lens according to the first embodiment, the focus lens unit (the third lens unit G3) is a single focus lens unit that shifts along the optical axis to effect focusing from infinity to a close distance at any focal length state from the wide angle end to the telephoto end.

By making it possible to effect focusing a single focus lens unit at any focal length state from the wide angle end to the telephoto end in this way, simplification of the driving mechanism for focusing is achieved.

In the zoom lens according to the first embodiment, the first wobbling lens unit A (the object side lens unit in the fifth lens unit G5) and the second wobbling lens unit B (the third lens unit G3) satisfy the following conditional expression (3):

$$0 \le |\alpha_{Bw}|/|\alpha_{Aw}| < 0.6 \quad (3).$$

The value of $|\alpha_{Bw}|/|\alpha_{Aw}|$ never falls below the lower limit of conditional expression (3).

If the focus sensitivity of the first wobbling lens unit A at the wide angle end is so high that the value of $|\alpha_{Bw}|/|\alpha_{Aw}|$ does not exceed the upper limit of conditional expression (3), the merit of power saving by switching the wobbling lens unit in the middle of zooming is further increased.

Moreover, the lower limit below which the value of $|\alpha_{Bw}|/|\alpha_{Aw}|$ does not fall may be changed to 0.001. Thereby, the focus sensitivity of the first wobbling lens unit A at the wide angle end can be made lower. This helps to keep the change in contrast with the wobbling operation within an allowable extent.

The zoom lens according to the first embodiment satisfies the following conditional expression (4):

$$5 < M_{Fw}/M_{Aw} \quad (4),$$

where $M_{Fw}$ is the maximum shift of the focus lens unit (the third lens unit G3) during the focusing operation from infinity to a close distance at the wide angle end, and $M_{Aw}$ is the maximum amplitude of wobbling of the first wobbling lens unit A (the object side lens unit in the fifth lens unit G5) at the time immediately after the zoom lens is focused at infinity at the wide angle end.

As the value of $M_{Fw}/M_{Aw}$ does not fall below the lower limit of conditional expression (4), the shortest possible focus distance at the wide angle end is made short.

The zoom lens according to the first embodiment satisfies the following conditional expression (5):

$$5 < M_{Ft}/M_{Bt} \quad (5),$$

where $M_{Ft}$ is the maximum shift of the focus lens unit (the third lens unit G3) during the focusing operation from infinity to a close distance at the telephoto end, and $M_{Bt}$ is the maximum amplitude of wobbling of the second wobbling lens unit B (the third lens unit G3) at the time immediately after the zoom lens is focused at infinity at the telephoto end.

As the value of $M_{Ft}/M_{Bt}$ does not fall below the lower limit of conditional expression (5), the shortest possible focus distance at the telephoto end is made short.

In the zoom lens according to the first embodiment, the first wobbling lens unit A (the object side lens unit in the fifth lens unit G5) and the second wobbling lens unit B (the third lens unit G3) each include three or less lenses.

Thus, the wobbling lens units are light in weight, making the load on the driving mechanism lower.

Moreover, in the zoom lens according to the first embodiment, the first wobbling lens unit A (the object side lens unit in the fifth lens unit G5) and the second wobbling lens unit B (the third lens unit G3) each include two or less lenses.

This leads to a further reduction in the weight of the wobbling lens units, making the load on the driving mechanism lower.

In the zoom lens according to the first embodiment, the second wobbling lens unit B (the third lens unit G3) satisfies the following conditional expression (6):

$$4 < |\alpha_{Bt}|/|\alpha_{Bw}| \quad (6).$$

The conditional expression (6) limits the value of the ratio of the focus sensitivity of the second wobbling lens unit B at the telephoto end to that at the wide angle end. If conditional expression (6) is satisfied, the focus sensitivity of the second wobbling lens unit B at the wide angle end is low.

The zoom lens has a wobbling lens unit of which the value of $|\alpha_{Bt}/\alpha_{Bw}|$ does not fall below the lower limit of conditional expression (6), and the wobbling operation is performed by another wobbling lens unit in the wide angle focal length range. Thus, the zoom lens enjoys the merit of switching over the wobbling lens unit, such as power saving.

In the zoom lens according to the first embodiment, at the wide angle end, the wobbling operation is performed by the first wobbling lens unit A (the object side lens unit in the fifth lens unit G5), and the second wobbling lens unit B (the third lens unit G3) is stationary while the first wobbling lens unit A (the object side lens unit in the fifth lens unit G5) is wobbling. At the telephoto end, the wobbling operation is performed by the second wobbling lens unit B (the third lens unit G3), and the first wobbling lens unit A (the object side lens unit in the fifth lens unit G5) is stationary while the second wobbling lens unit B (the third lens unit G3) is wobbling. The wobbling lens unit caused to wobble is switched over from the first wobbling lens unit A (the object side lens unit in the fifth lens unit G5) to the second wobbling lens unit B (the third lens unit G3) in the middle of zooming from the wide angle end to the telephoto end. Moreover, the zoom lens satisfies the following conditional expression (7):

$$0.2 < (f_{switch}/f_w)/(f_t/f_w) < 0.8 \quad (7)$$

where $f_{switch}$ is the upper limit of the range of focal length of the entire zoom lens system in which the wobbling operation is performed by the first wobbling lens unit A, $f_w$ is the focal length of the entire zoom lens system at infinity focus at the wide angle end, and $f_t$ is the focal length of the entire zoom lens system at infinity focus at the telephoto end.

If the wobbling lens unit caused to operate is switched over at a focal length that does not make the value of $(f_{switch}/f_w)/(f_t/f_w)$ not fall below the lower limit of conditional expression (7) nor exceed the upper limit of conditional expression (7), merit of switching over the wobbling lens unit such as power saving is enjoyed.

The zoom lens according to the first embodiment includes a negative lens unit group having a negative refractive power (composed of the second lens unit G2 and the third lens unit G3) and a positive lens unit group having a positive refractive power (composed of the fourth lens unit G4 and the fifth lens unit G5), which is arranged on the image side of the negative lens unit group. The second wobbling lens unit B (the third lens unit G3) is included in the negative lens unit group, and the first wobbling lens unit A (the object side lens unit in the fifth lens unit G5) is included in the positive lens unit group.

The zoom lens according to the first embodiment further includes the first lens unit (the first lens unit G1) having a positive refractive power, which is arranged on the object side of the negative lens unit group (composed of the second lens unit G2 and the third lens unit G3). The negative lens unit group (composed of the second lens unit G2 and the third lens unit G3) includes, in order from the object side, the second lens unit (the second lens unit G2) having a negative refractive power and the third lens unit (the third lens unit G3) having a negative refractive power. The positive lens unit group (composed of the fourth lens unit G4 and the fifth lens unit G5) includes, in order from the object side, the fourth lens unit (the fourth lens unit G4) having a positive refractive power and the fifth lens unit (the fifth lens unit G5) having a positive refractive power. During zooming from the wide angle end to the telephoto end, the distance between the first lens unit (the first lens unit G1) and the second lens unit (the second lens unit G2), the distance between the third lens unit (the third lens unit G3) and the fourth lens unit (the fourth lens unit G4), and the distance between the fourth lens unit (the fourth lens unit G4) and the fifth lens unit (the fifth lens unit G5) change.

Moreover, in the zoom lens according to the first embodiment, the fifth lens unit (the fifth lens unit G5) includes, in order from the object side, the object side lens unit and an image side lens unit, the third lens unit (the third lens unit G3) serves as the second wobbling lens unit B (the third lens unit G3) and the focus lens unit (the third lens unit G3), and the object side lens unit in the fifth lens unit (the fifth lens unit G5) serves as the first wobbling lens unit A.

In the zoom lens according to the first embodiment, the distance between the second lens unit (the second lens unit G2) and the third lens unit (the third lens unit G3) changes during zooming from the wide angle end to the telephoto end.

As described later, the zoom lens according to the first embodiment and an image pickup element arranged on the image side of the zoom lens to generate an electrical signal based on an optical image formed by the zoom lens may constitute an image pickup apparatus.

First Example

Example 1

Figure 1A:
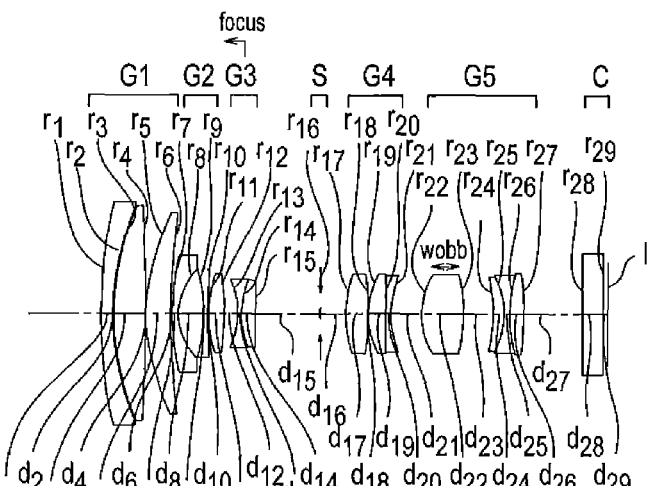
FIGS. 1A, 1B, and 1C are cross sectional views of a zoom lens according to a first example (example of a first embodiment) taken along its optical axis, showing its configuration in the state in which the zoom lens is focused on an object point at infinity, where
Figure 1B:
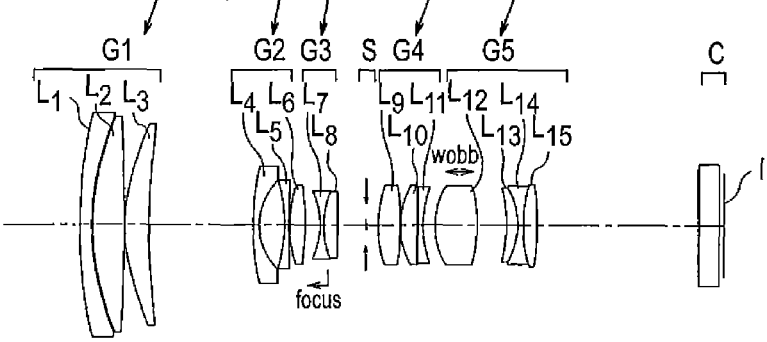
Figure 1C:
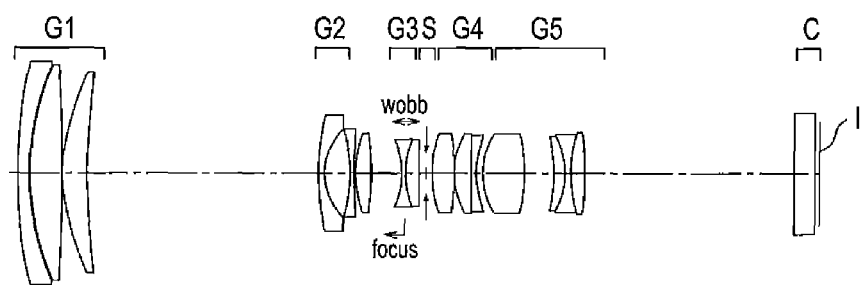

In the following, a first example (example of the zoom lens according to the first embodiment) will be described. FIGS. 1A, 1B, and 1C are cross sectional views of a zoom lens according to a first example taken along its optical axis, showing its configuration in the state in which the zoom lens is focused on an object point at infinity, where FIG. 1A shows the state at the wide angle end (W), FIG. 1B shows the state in an intermediate focal length state (S), and FIG. 1C shows the state at the telephoto end (T). In FIGS. 1A, 1B, and 1C, a first lens unit is denoted by G1, a second lens unit is denoted by G2, a third lens unit is denoted by G3, a fourth lens unit is denoted by G4, a fifth lens unit is denoted by G5, an aperture stop S is denoted by S, a plane parallel plate constituting a cover glass of an electronic image pickup element is denoted by C, and the image plane is denoted by I. Multi-layer coating for wavelength restriction may be applied to the surface of the cover glass C. The cover glass C may be adapted to have a low pass filtering function.

In the first example, the aperture stop S moves toward the object side with the distance between it and the fourth lens unit G4 being varied. All the numerical data given below is for the state in which the zoom lens is focused on an object at infinity. In numerical data, lengths are in millimeters, and angles are in degrees. Focusing is performed by shifting the third lens unit G3. Values in zoom data are given for the wide angle end (wide angle W), for the intermediate focal length state (intermediate S), and for the telephoto end (telephoto T). Values for a state WS between the wide angle end and the intermediate focal length state and for a state ST between the intermediate focal length state and the telephoto end are also given.

As shown in FIGS. 1A, 1B, and 1C, the zoom lens according to the first example includes, in order from the object side, a first lens unit G1 having a positive refractive power, a second lens unit G2 having a negative refractive power, a third lens unit G3 having a negative refractive power, an aperture stop S, a fourth lens unit G4 having a positive refractive power, and a fifth lens unit G5 having a positive refractive power.

During zooming from the wide angle end to the telephoto end, the first lens unit G1, the second lens unit G2, the third lens unit G3, the aperture stop S, the fourth lens unit G4, and the fifth lens unit G5 move toward the object side.

The first lens unit G1 is composed of a negative meniscus lens L1 having a convex surface directed toward the object side, a biconvex positive lens L2, and a positive meniscus lens L3 having a convex surface directed toward the object side. The second lens unit G2 is composed of a negative meniscus lens L4 having a convex surface directed toward the object side, a biconcave negative lens L5, and a biconvex positive lens L6. The third lens unit G3 is composed of a cemented lens made up of a biconcave negative lens L7 and a biconvex positive lens L8. The fourth lens unit G4 is composed of a biconvex positive lens L9 and a cemented lens made up of a biconvex positive lens L10 and a biconcave negative lens L11. The fifth lens unit G5 is composed of a biconvex positive lens L12, a positive meniscus lens L13 having a concave surface directed toward the object side, a biconcave negative lens L14, and a biconvex positive lens 15. The positive meniscus lens L13, the biconcave negative lens 14, and the biconvex positive lens 15 are cemented together. The lenses in each lens unit are arranged in the mentioned order from the object side.

There are six aspheric surfaces, which include both surfaces of the negative meniscus lens L4, both surfaces of the biconvex positive lens L9, and both surfaces of the biconvex positive lens L12.

In the following, numerical data of the above-described example (First example) will be presented. Besides those mentioned above, the following symbols will be used: f is the focal length of the entire system, fb is the back focus; f1, f2, . . . is the focal length of the respective lens units; FNO is the F-number; ω is the half angle of view, r is the curvature radius of each lens surface; d is the distance between lens surfaces; nd is the refractive index of each lens with respect to the d-line; and vd is the Abbe constant of each lens with respect to the d-line. The overall lens length mentioned later is the distance from the frontmost lens surface to the last lens surface plus the back focus. The back focus fb is the distance from the last lens surface to the paraxial image plane expressed by the equivalent air distance.

Aspheric surface shapes are expressed by the following equation (I) using aspheric coefficients, where coordinate Z is taken along the optical axis, and coordinate Y is taken along a direction perpendicular to the optical axis.

$$Z=(Y^2/r)/[1+\{1-(1+k)\cdot(Y/r)^2\}^{1/2}]+A_4\times Y^4+A_6\times Y^6+A_8\times Y^8+A_{10}\times Y^{10}+A_{12}\times Y^{12} \quad (I),$$

where r is the paraxial curvature radius, k is a conic coefficient, and A4, A6, A8, A10, and A12 are 4th order, 6th order, 8th order, 10th order, and 12th order aspheric coefficients respectively.

In the aspheric coefficients, the expression "e-n" stands for "$10^{-n}$".

Example 1

| | | unit mm | | |
|---|---|---|---|---|
| | | Surface data | | |
| Surface No | r | d | nd | vd |
| Object plane | ∞ | ∞ | | |
| 1 | 107.429 | 2.100 | 1.80000 | 29.84 |
| 2 | 51.934 | 0.200 | | |
| 3 | 51.586 | 6.750 | 1.49700 | 81.54 |
| 4 | −350.456 | 0.150 | | |
| 5 | 45.821 | 4.650 | 1.61800 | 63.33 |
| 6 | 139.892 | Variable | | |
| 7* | 92.127 | 1.200 | 1.80476 | 40.87 |
| 8* | 13.098 | 5.100 | | |
| 9 | −27.150 | 0.900 | 1.77250 | 49.60 |
| 10 | 168.754 | 0.150 | | |
| 11 | 25.991 | 3.050 | 1.80518 | 25.42 |
| 12 | −57.701 | Variable | | |
| 13 | −16.073 | 0.900 | 1.78800 | 47.37 |
| 14 | 18.419 | 2.700 | 1.75520 | 27.51 |
| 15 | −94.698 | Variable | | |
| 16(stop) | ∞ | Variable | | |
| 17* | 20.030 | 4.500 | 1.58313 | 59.38 |
| 18* | −67.433 | 0.150 | | |
| 19 | 16.633 | 3.400 | 1.61800 | 63.33 |
| 20 | −236.437 | 0.900 | 1.90366 | 31.32 |
| 21 | 16.385 | Variable | | |
| 22* | 16.893 | 8.499 | 1.49650 | 81.53 |
| 23* | −21.997 | 6.153 | | |
| 24 | −27.909 | 1.900 | 1.53172 | 48.84 |
| 25 | −16.073 | 1.200 | 1.88300 | 40.76 |
| 26 | 32.284 | 3.000 | 1.69895 | 30.13 |
| 27 | −48.781 | Variable | | |
| 28 | ∞ | 4.082 | 1.51633 | 64.14 |
| 29 | ∞ | 0.745 | | |
| Image plane (Light receiving surface) | ∞ | | | |

Aspherical surface data

7th surface

K = 44.417
A2 = 0.0000E+00, A4 = 4.2031E−05, A6 = −7.4052E−07, A8 = 7.3001E−09,
A10 = −3.6364E−11, A12 = 7.0703E−14

8th surface

K = 0.4167
A2 = 0.0000E+00, A4 = 2.0472E−05, A6 = −8.4199E−07, A8 = 4.8452E−09,
A10 = −1.7103E−11

17th surface

K = 0.0084
A2 = 0.0000E+00, A4 = −2.0286E−05, A6 = 1.7390E−07, A8 = −2.2692E−09,
A10 = 1.9132E−11

18th surface

K = −75.9294
A2 = 0.0000E+00, A4 = −2.2343E−05, A6 = 4.5417E−07, A8 = −3.2814E−09,
A10 = 1.7270E−12, A12 = 2.0758E−13

22th surface

K = 0.1523
A2 = 0.0000E+00, A4 = −1.1838E−05, A6 = 4.4451E−07, A8 = 2.5858E−10,
A10 = 2.7464E−11

23th surface

K = −0.7630
A2 = 0.0000E+00, A4 = 6.4571E−05, A6 = 4.9448E−07, A8 = 6.7260E−10,
A10 = 4.8251E−11, A12 = 4.2985E−13

-continued unit mm

Zoom ratio 10.31
Zoom data

|  | Wide angle (W) | WS | Intermediate (S) | ST | Telephoto (T) |
|---|---|---|---|---|---|
| Maximum image height (after correction of distortion) | 10.61 | 11.45 | 11.45 | 11.45 | 11.45 |
| f(mm) | 14.28 | 25.43 | 45.73 | 82.91 | 147.00 |
| F NO. | 4.08 | 4.91 | 5.68 | 5.75 | 5.77 |
| 2ω (Angle of field) | 80.2 |  | 27.6 |  | 8.8 |
| fb (in air) | 15.32 | 24.14 | 36.24 | 41.02 | 45.78 |
| Lens total length (in air) | 100.39 | 111.72 | 128.28 | 148.01 | 159.38 |
| d6 | 0.500 | 11.396 | 21.229 | 37.070 | 46.316 |
| d12 | 2.706 | 2.552 | 2.877 | 5.621 | 6.149 |
| d15 | 12.772 | 7.955 | 5.692 | 2.085 | 1.402 |
| d16 | 5.081 | 3.999 | 2.261 | 3.400 | 0.983 |
| d21 | 6.424 | 4.098 | 2.394 | 1.235 | 1.175 |
| d27 | 11.899 | 20.703 | 32.807 | 37.585 | 42.342 |

Unit focal length

| f1 = 81.45 | f2 = −29.73 | f3 = −23.78 | f4 = 33.60 | f5 = 32.55 |
|---|---|---|---|---|

Focusing Data

|  | Wide angle (W) | WS | Intermediate (S) | ST | Telephoto (T) |
|---|---|---|---|---|---|
| Focus Unit | G3 | G3 | G3 | G3 | G3 |
| Shift Amount (Maximum Shift Amount) | 0.443 | 0.688 | 1.015 | 2.144 | 4.235 |

Wobbling Data (At Infinity Focus, Full Aperture)
Wobbling Amplitude

|  | Wide angle (W) | WS | Intermediate (S) | ST | Telephoto (T) |
|---|---|---|---|---|---|
| Wobbling Lens Unit A | 0.005 | 0.008 | 0.011 | 0 (Stationary) | 0 (Stationary) |
| Wobbling Lens unit B | 0 (Stationary) | 0 (Stationary) | 0 (Stationary) | 0.011 | 0.012 |

Focus Sensitivity (At Infinity Focus, Full Aperture)

|  | Wide angle (W) | WS | Intermediate (S) | ST | Telephoto (T) |
|---|---|---|---|---|---|
| Wobbling Lens Unit A | 2.595 | 3.460 | 4.654 | 5.128 | 5.600 |
| Wobbling Lens Unit B | 1.002 | 2.166 | 4.642 | 6.151 | 7.742 |

Values of Terms in Conditional Expressions $|\alpha Aw| = (1 - \beta wobAw2) \times \beta rAw2 =$
$(1 - (-0.026)2) \times (1.612)2 = 2.595$
$|\alpha Bw| = (1 - \beta wobBw2) \times \beta rBw2 =$
$(1 - (0.276)2) \times (-1.041)2 = 1.002$
$|\alpha At| = (1 - \beta wobAt2) \times \beta rAt2 =$
$(1 - (-0.382)2) \times (2.561)2 = 5.600$
$|\alpha Bt| = (1 - \beta wobBt2) \times \beta rBt2 =$
$(1 - (0.063)2) \times (-2.788)2 = 7.742$
MFw = 0.443
MAw = 0.005
MFt = 4.235
MBt = 0.012
fswitch = 45.73
fw = 14.28
ft = 147.00

Parameter and values of conditional expressions

| | |
|---|---|
| $|\alpha Aw|/|\alpha Bw|=2.587$ | conditional expression (1) |
| $|\alpha At|/|Bt|=0.723$ | conditional expression (2) |
| $|\alpha Bw|/|\alpha Aw|=0.386$ | conditional expression (3) |
| $MFw/MAw=88.6$ | conditional expression (4) |
| $MFt/MBt=352.9$ | conditional expression (5) |
| $|\alpha Bt|/|\alpha Bw|=7.727$ | conditional expression (6) |
| $(f\text{switch}/fw)/(ft/fw)=0.311$ | conditional expression (7) |

(Digital Camera)

Figure 3:
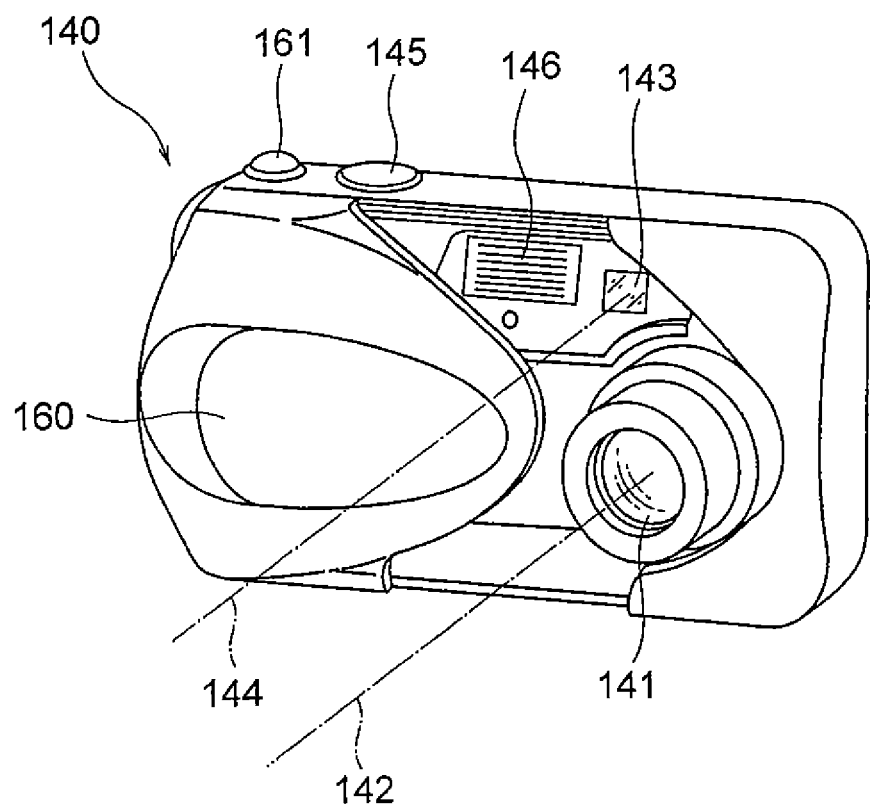
FIG. 3 is a front perspective view showing the outer appearance of a digital camera as an image pickup apparatus equipped with the zoom lens according to the first embodiment.
Figure 4:
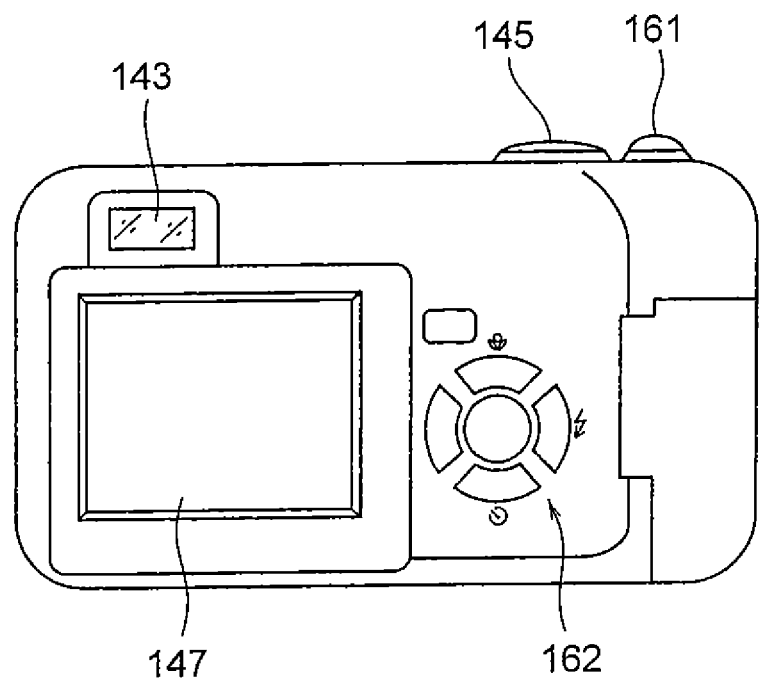
FIG. 4 is a rear view of the digital camera shown in FIG. 3.
Figure 5:
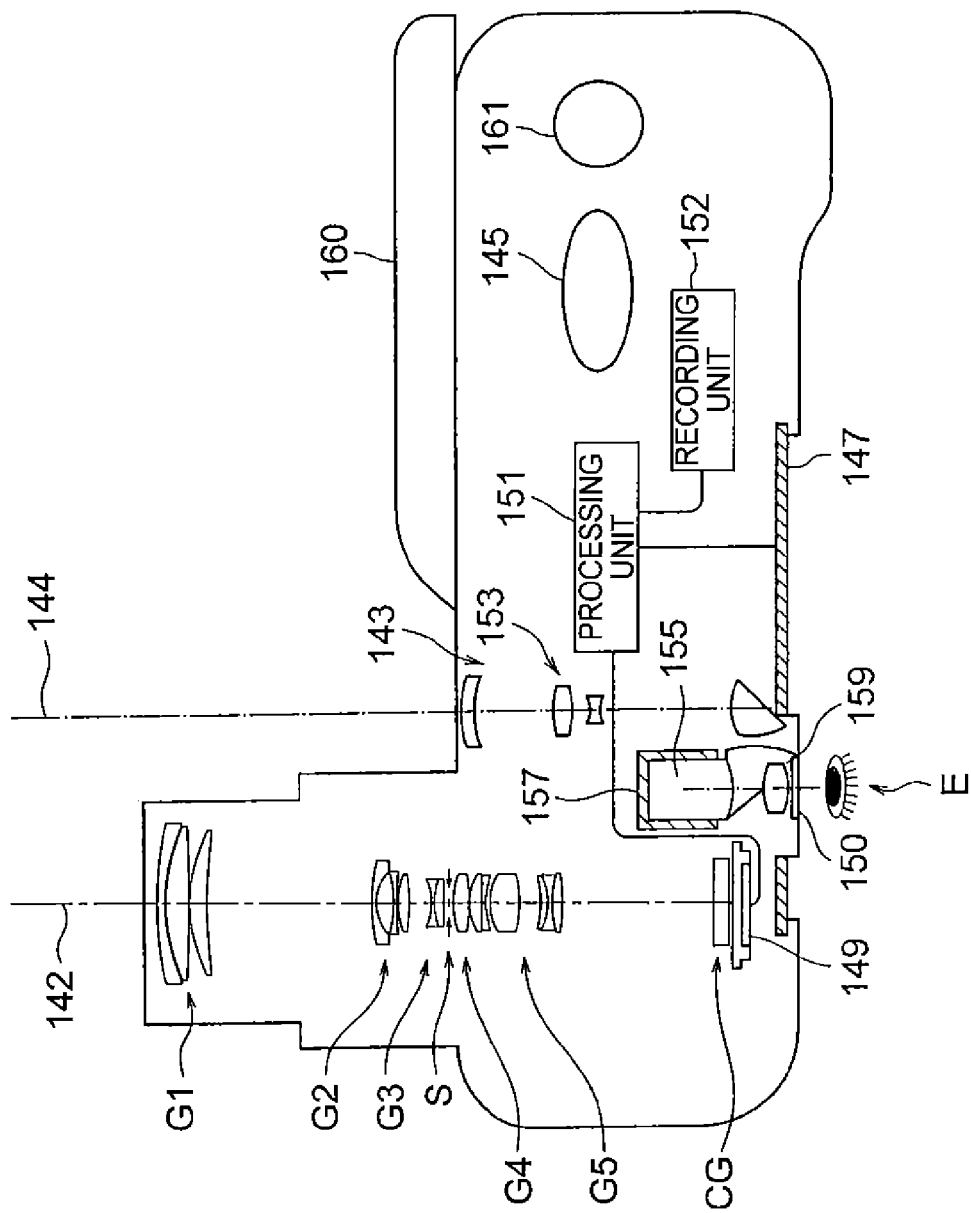
FIG. 5 is a cross sectional view of the digital camera shown in FIG. 3.

FIGS. 3 to 5 are diagrams showing a digital camera according to the first embodiment, which is equipped with the above-described zoom lens as a taking optical system 141. FIG. 3 is a front perspective view showing the outer appearance of the digital camera 140, FIG. 4 is a rear view of the digital camera 140, and FIG. 5 is a schematic cross sectional view showing the configuration of the digital camera 140. FIGS. 3 and 5 show the digital camera in a state in which the taking optical system 141 is not collapsed. The digital camera 140 according to this embodiment has a taking optical system 141 having a taking optical path 142, a viewfinder optical system 143 having a viewfinder optical path 144, a shutter release button 145, a flash 146, a liquid crystal display monitor 147, a focal length changing button 161, and a setting changing switch 162. When the taking optical system 141 is in a collapsed state, the taking optical system 141, the viewfinder optical system 143, and the flash 146 are covered with the cover 160 by sliding the cover 160. When the cover 160 is opened to bring the digital camera 140 into a state ready for shooting, the taking optical system 140 is brought into a state shown in FIG. 5 in which it is not collapsed. When the shutter release button 145 provided on the top of the digital camera 140 is depressed, shooting through the taking optical system 141, e.g. the zoom lens according to the first example, is effected responsively. An image of an object is formed by the taking optical system 141 on the image pickup surface of the CCD 149 through the cover glass CG on which wavelength restriction coating is applied. The image of the object received by the CCD 149 is displayed as an electronic image on the liquid crystal display monitor 147 provided on the back of the camera by processing unit 151. Recording unit 152 may be connected to the processing unit 151 to record picked-up electronic images. The recording unit 152 may be provided separately from the processing unit 151. The recording unit 152 may be a flexible disk, a memory card, an MO or the like, on which data may be electronically recorded. The camera may be a film camera using silver halide films instead of the CCD 149.

A viewfinder objective optical system 153 is provided in the viewfinder optical path 144. The viewfinder objective optical system 153 includes a plurality of lens units (three lens units in the case shown in FIG. 5) and two prisms. The viewfinder optical system 153 is a zoom optical system whose focal length changes in synchronization with the zoom lens of the taking optical system 141. An image of an object is formed by the viewfinder optical system 153 in a view field frame 157 of an erecting prism 155 functioning as an erecting part. An eyepiece optical system 159 that delivers the erected image to a viewer's eye E is provided in rear of the erecting prism 155. A cover member 150 is provided on the exit side of the eyepiece optical system 159.

The digital camera 140 having the above-described construction has the taking optical system. 141 according to the first embodiment, which is very small in thickness when collapsed, has a high zoom ratio, and has very stable imaging performance throughout the entire zoom range. Therefore, high performance, small size, and wide angle of view can be achieved.

The zoom lens may be constructed as an interchangeable lens which is detachable from the camera body having the image pickup element.

Nowadays, interchangeable lens cameras without a quick-return mirror are popular as well as single lens reflex cameras having a quick return mirror provided in the camera body. The zoom lens according to the first example has an appropriately short back focus. Therefore, it is preferred that the zoom lens be used as an interchangeable lens for a camera without a quick-return mirror.

(Internal Circuit Configuration)

Figure 6:
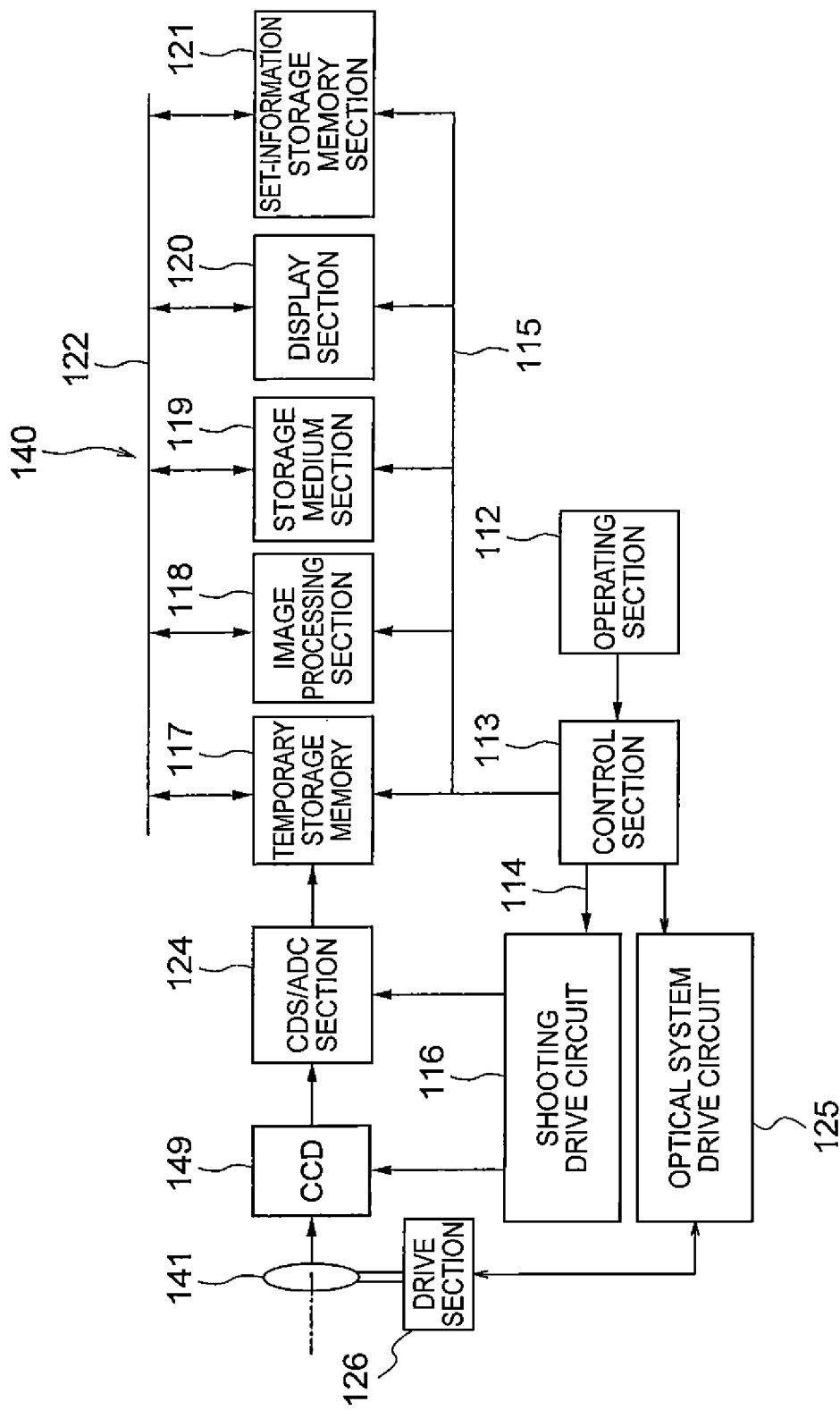
FIG. 6 is a block diagram showing an internal circuit configuration of a relevant portion of the digital camera shown in FIG. 3.

FIG. 6 is a block diagram of the relevant portion of the internal circuit of the digital camera 140. In the case described here, the processing unit described above includes for instance, a CDS/ADC section 124, a temporary storage memory 117, and an image processing section 118, and the storage unit includes a storage medium 119 for example.

As shown in FIG. 6, the digital camera 140 has an operating section 112 and a control section 113 connected to the operating section 112, an image pickup drive circuit 116 connected to a control signal output port of the control section 113 via a bus 114, the temporary storage memory 117, the image processing section 118, the storage medium. 119, a display section 120, and a set-information storage memory section 121. The temporary storage memory 117, the image processing section 118, the storage medium 119, the display section 120, and the set-information storage memory section 121 are connected to control signal output ports of the control section 113 via bus 115.

The temporary storage memory 117, the image processing section 118, the storage medium section 119, the display section 120, and the set-information storage memory section 121 are configured to be capable of mutually inputting and outputting data via a bus 122. Moreover, the CCD 149 and the CDS/ADC section 124 are connected to the image pickup drive circuit 116.

The operation section 112 is a circuit equipped with various input buttons and switches, which notifies the control section of event information entered from outside (by a user of the camera) through the input buttons and switches. An optical system drive circuit 125 communicates with a drive section 126 that drives the taking optical system 141. The optical system drive circuit 125 reads the zoom state of the taking optical system 141 by a signal from the drive section 126. The optical system drive circuit 125 switches the wobbling lens unit in the taking optical system 141 in accordance with the zoom state of the taking lens system 141. In addition to switching the wobbling lens unit, the optical system drive circuit 125 sends control signals to the drive section 126 to control the taking optical system 141 in response to zooming operation and focusing operation through the operation section 112.

The control section 113 is, for example, a central processing unit (CPU) and has a built-in program memory, which is not shown in the drawings. The control section 113 is a circuit that controls the entire digital camera 140 according to a program stored in the program memory, in response to instructions and commands entered by the user of the camera through the operating section 112.

The CCD 149 receives an image of the object formed by the taking optical system 141 according to the present invention. The CCD 149 is an image pickup element that is driven and controlled by the image pickup drive circuit 116 to convert the quantity of light of the object image into an electrical signal on a pixel-by-pixel basis and output it to the CDS/ADC section 124.

The CDS/ADC section 124 is a circuit that amplifies the electrical signal input from the CCD 149, performs analog-to-digital conversion, and outputs to the temporary storage memory 117 raw image data (or Bayer data, which will be hereinafter referred to as "RAW data") that has undergone only amplification and digital conversion.

The temporary storage memory 117 serves as a buffer and may consist of an SDRAM for example. The temporary storage memory 117 is a memory device that temporarily stores the RAW data output from the CDS/ADC section 124. The image processing section 118 is a circuit that reads the RAW data stored in the temporary storage memory 117 or the RAW data stored in the storage medium section 119 and performs various electrical image processing including distortion correction based on image-quality parameters specified by the control section 113.

The storage medium section 119 allows a detachable mounting of a recording medium such as, for example, a card-type or stick-type flash memory. The storage medium section 119 is a control circuit of the apparatus that records or writes RAW data transferred from the temporary storage memory 117 and image data having been processed in the image processing section 118 in the card-type or stick-type flash memory to have the data stored in it.

The display section 120 is equipped with the liquid-crystal display monitor and causes it to display images and operation menu etc. The set-information storage memory section 121 includes a ROM section in which various image-quality parameters are stored in advance and a RAM section for storing image quality parameters selected by entries made through the operating section 112 from among the image quality parameters read from the ROM section. The set-information storage memory section 121 is a circuit that controls the input/output to/from the memories.

The digital camera 140 having the above-described construction has the taking optical system 141 according to the first embodiment, which has a sufficiently wide angle of view, a high zoom ratio, and very stable imaging performance throughout the entire zoom range, while having a compact construction. Therefore, high performance, small size, and wide angle of view can be achieved. Moreover, quick focusing operation is possible in the wide angle and telephoto focal length ranges.

Second Embodiment

A zoom lens according to the second embodiment includes, in order from the object side to the image side (image pickup element side),
  a first lens unit G1 having a positive refractive power,
  a second lens unit G2 having a negative refractive power,
  a third lens unit G3 having a positive refractive power,
  an aperture stop S,
  a shutter (shutter blade) SH
  a fourth lens unit G4 having a positive refractive power, and
  a fifth lens unit G5 having a positive refractive power The zoom lens has an infrared cut filter F and a cover glass C for an image pickup element (such as CCD or C-MOS). The zoom lens forms an image on an image pickup surface I of the image pickup element.

In the zoom lens according to the second embodiment, the second lens unit G2 constitutes a negative lens unit group. The fourth lens unit G4 and the fifth lens unit G5 constitute a positive lens unit group.

The first lens unit G1 includes a rectangular prism that bends the optical axis. In a second example shown in FIGS. 7A, 7B, 7C, 7D, and 7E, the rectangular prism L2 is illustrated as a plane parallel plate in development.

In the zoom lens according to the second embodiment, during zooming from the wide angle end (FIG. 7A) to the telephoto end (FIG. 7C), the distance between the first lens unit G1 and the second lens unit G2 increases, the distance between the second lens unit G2 and the third lens unit G3 decreases, the distance between the third lens unit G3 and the fourth lens unit G4 decreases, and the distance between the fourth lens unit G4 and the fifth lens unit G5 increases.

The first lens unit G1, the third lens unit G3, the aperture stop S, the shutter blade SH, and the fifth lens unit G5 are always stationary.

During zooming from the wide angle end (W) (FIG. 7A) to a state WS and to an intermediate focal length state (S) (FIG. 7C), and during zooming from the intermediate focal length state (S) (FIG. 7C) to a state ST and to the telephoto end (T) (FIG. 7E), the second lens unit G2 moves toward the image side, and the fourth lens unit G4 moves toward the object side.

Focusing operation in the zoom lens according to the second embodiment is now described.

In the focal length range from the wide angle end to the intermediate focal length state, focusing operation from infinity to a close distance is performed by moving the fourth lens unit G4 (focus lens unit) toward the object side. Moreover, in the focal length range from the intermediate focal length state to the telephoto end, focusing operation from infinity to a close distance is performed by moving the second lens unit G2 (focus lens unit) toward the object side.

Figure 8:
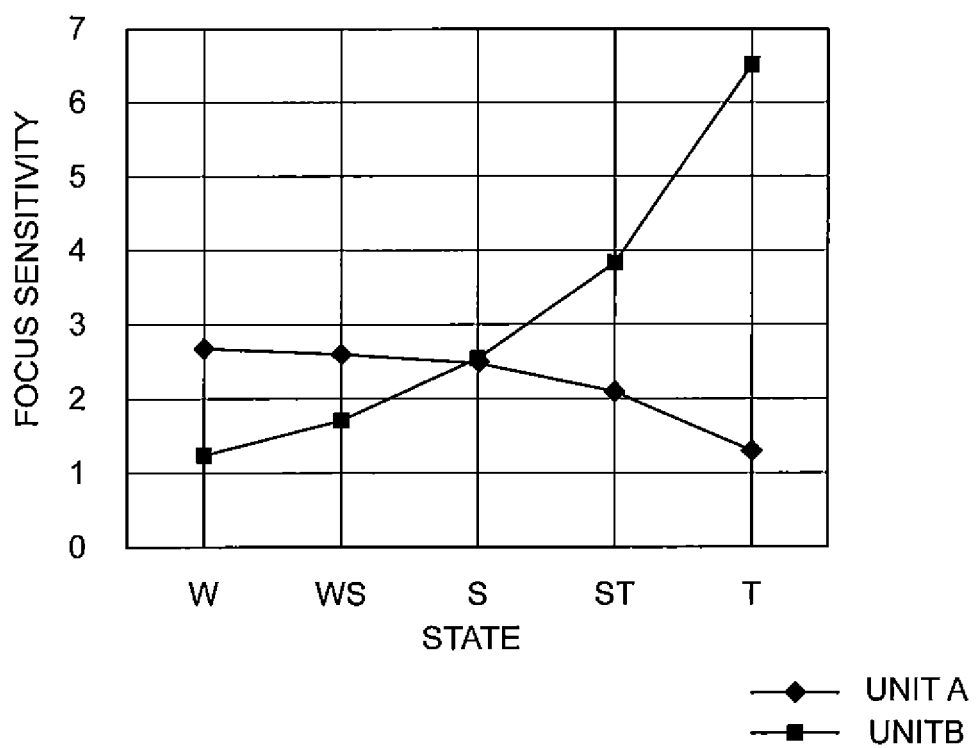
FIG. 8 is a graph showing changes in the focus sensitivity of a first wobbling lens unit A and a second wobbling lens unit B in the second embodiment.

Wobbling operation in the zoom lens according to the second embodiment will be described with reference to FIG. 8. FIG. 8 is a graph showing changes in the focus sensitivity of a first wobbling lens unit A and a second wobbling lens unit B in the second embodiment.

The zoom lens according to the second embodiment has two wobbling lens units. The wobbling lens units minutely oscillate at high speed after an object is brought into focus by the focus lens unit, thereby changing the contrast to a small extent. Changes in the contrast of an image formed on the image pickup surface are detected by a system including the image pickup element to determine the in-focus state and the out-of-focus state and to determine the moving direction of an object.

Moreover, the wobbling lens unit caused to operate is switched over at the intermediate focal length state (S).

In the focal length range from the wide angle end (W) to the intermediate focal length state (S), the wobbling operation is performed by minutely oscillating the fourth lens unit G4 (first wobbling lens unit A) at high speed along the direction of the optical axis.

In the focal length range from the intermediate focal length state (S) to the telephoto end, the wobbling operation is performed by minutely oscillating the second lens unit G2 (second wobbling lens unit B) at high speed along the direction of the optical axis.

In the zoom lens according to the second embodiment, each of the distances between the lens units (including the first through fifth lens units G1-G5) changes during zooming from the wide angle end to the telephoto end. The zoom lens includes focus lens units (the second lens unit G2 and the fourth lens unit G4) that shift along the optical axis to effect focusing from infinity to a close distance. The zoom lens includes a plurality of wobbling lens units (the second lens unit G2 and the fourth lens unit G4) that wobble along the optical axis at an amplitude smaller than the amount of shift of the focus lens units in focusing, after a shift of the focus lens units.

The combination of the wobbling lens units caused to operate changes in the middle of the zooming from the wide angle end to the telephoto end.

In the zoom lens according to the second embodiment, both of the wobbling lens units (the second lens unit G2 and the fourth lens unit G4) also serve as the focus lens units (the second lens unit G2 and the fourth lens unit G4) that shift along the optical axis during focusing from infinity to a close distance.

Let one of the plurality of wobbling lens units in the zoom lens according to the second embodiment be referred to as a first wobbling lens unit A (which is the fourth lens unit G4) and the other be referred to as a second wobbling lens unit B (which is the second lens unit G2). While at the wide angle end the first wobbling lens unit A (the fourth lens unit G4) wobbles, at the telephoto end the second wobbling lens unit B (the second lens unit G2) wobbles. In addition, the zoom lens satisfies the aforementioned conditional expressions (1) and (2).

Moreover, the zoom lens according to the second embodiment includes the first focus lens unit (fourth lens unit G4) by which focusing from infinity to a close distance is performed at the wide angle end and the second focus lens unit (the second lens unit G2) by which focusing from infinity to a close distance is performed at the telephoto end. The first focus lens unit (the fourth lens unit G4) and the first wobbling lens unit A (the fourth lens unit G4) are the same, and the second focus lens unit (the second lens unit G2) and the second wobbling lens unit B (the second lens unit G2) are the same.

In the zoom lens according to the second embodiment, the first wobbling lens unit A (the fourth lens unit G4) and the second wobbling lens unit B (the second lens unit G2) satisfy the aforementioned conditional expression (3).

In the zoom lens according to the second embodiment, the maximum shift $M_{Fw}$ of the first focus lens unit (the fourth lens unit G4) during the focusing operation from infinity to a close distance at the wide angle end and the maximum amplitude $M_{Aw}$ of wobbling of the first wobbling lens unit A (the fourth lens unit G4) at the time immediately after the zoom lens is focused at infinity at the wide angle end satisfy the aforementioned conditional expression (4).

In the zoom lens according to the second embodiment, the maximum shift $M_{Ft}$ of the second focus lens unit (the second lens unit G2) during the focusing operation from infinity to a close distance at the telephoto end and the maximum amplitude $M_{Bt}$ of wobbling of the second wobbling lens unit B (the second lens unit G2) at the time immediately after the zoom lens is focused at infinity at the telephoto end satisfy the aforementioned conditional expression (5).

In the zoom lens according to the second embodiment, the first wobbling lens unit A (the fourth lens unit G4) and the second wobbling lens unit B (the second lens unit G2) each include three or less lenses.

In the zoom lens according to the second embodiment, the second wobbling lens unit B (the second lens unit G2) satisfies the aforementioned conditional expression (6).

In the zoom lens according to the second embodiment, at the wide angle end, the wobbling operation is performed by the first wobbling lens unit A (the fourth lens unit G4), and the second wobbling lens unit B (the second lens unit G2) is stationary while the first wobbling lens unit A (the fourth lens unit G4) is wobbling. At the telephoto end, the wobbling operation is performed by the second wobbling lens unit B (the second lens unit G2), and the first wobbling lens unit A (the fourth lens unit G4) is stationary while the second wobbling lens unit B (the second lens unit G2) is wobbling. The wobbling lens unit caused to wobble is switched over from the first wobbling lens unit A (the fourth lens unit G4) to the second wobbling lens unit B (the second lens unit G2) in the middle of zooming from the wide angle end to the telephoto end. Moreover, the zoom lens satisfies the aforementioned conditional expression (7).

The zoom lens according to the second embodiment includes a negative lens unit group having a negative refractive power (the second lens unit G2) and a positive lens unit group having a positive refractive power (composed of the third lens unit G3, the fourth lens unit G4, and the fifth lens unit G5), which is arranged on the image side of the negative lens unit group. The second wobbling lens unit B (the second lens unit G2) is included in the negative lens unit group, and the first wobbling lens unit A (the fourth lens unit G4) is included in the positive lens unit group.

The zoom lens according to the second embodiment further includes the first lens unit (the first lens unit G1) having a positive refractive power, which is arranged on the object side of the negative lens unit group (the second lens unit G2). The positive lens unit group includes, in order from the object side, the third lens unit (the third lens unit G3) having a positive refractive power, the fourth lens unit (the fourth lens unit G4) having a positive refractive power, and the fifth lens unit (fifth lens unit G5) having a positive refractive power. During zooming from the wide angle end to the telephoto end, the distance between the first lens unit (the first lens unit G1) and the negative lens unit group (the second lens unit G2), the distance between the negative lens unit group (the second lens unit G2) and the third lens unit (the third lens unit G3), the distance between the third lens unit (the third lens unit G3) and the fourth lens unit (the fourth lens unit G4), and the distance between the fourth lens unit (the fourth lens unit G4) and the fifth lens unit (the fifth lens unit G5) change.

The above features help to achieve a sufficiently high zoom ratio and to maintain optical performance.

In the zoom lens according to the second embodiment, the first lens unit (the first lens unit G1), the third lens unit (the third lens unit G3), and the fifth lens unit (the fifth lens unit G5) are stationary during zooming from the wide angle end to the telephoto end. The negative lens unit group (the second lens unit G2) moves during zooming from the wide angle end to the telephoto end. The fourth lens unit (the fourth lens unit G4) moves during zooming from the wide angle end to the telephoto end. The negative lens unit group (the second lens unit G2) serves as the second wobbling lens unit B and the second focus lens unit. The fourth lens unit (the fourth lens unit G4) serves as the first wobbling lens unit A and the first focus lens unit. The first focus lens unit is the focus lens unit that performs focusing from infinity to a close distance at the wide angle end. The second focus lens unit is the focus lens unit that performs focusing from infinity to a close distance at the telephoto end.

With the above features, the number of movable lens units is made small, leading to a reduction in the number of driving parts.

The above features also help to control the entrance of dust into the zoom lens and to reduce noises generated with movement of lens units.

As described later, the zoom lens according to the second embodiment and an image pickup element arranged on the image side of the zoom lens to generate an electrical signal based on an optical image formed by the zoom lens constitute an image pickup apparatus.

Second Example

Example 2

Figure 7A:
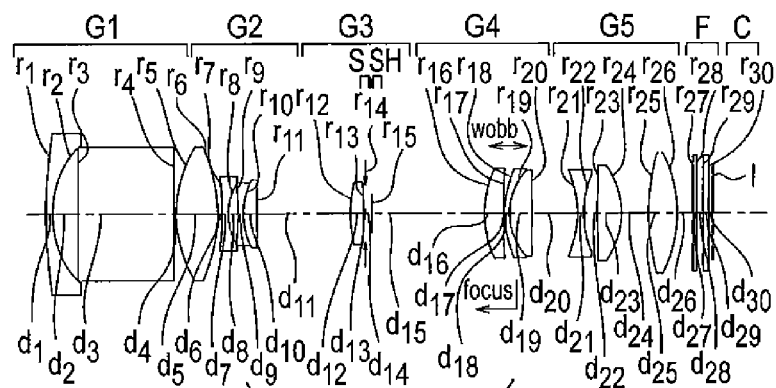
FIGS. 7A, 7B, 7C, 7D, and 7E are cross sectional views of a zoom lens according to a second example (example of a second embodiment) taken along its optical axis, showing its configuration in the state in which the zoom lens is focused on an object point at infinity, where
Figure 7B:
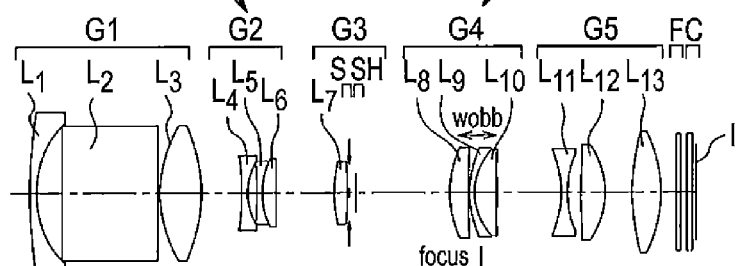
Figure 7C:
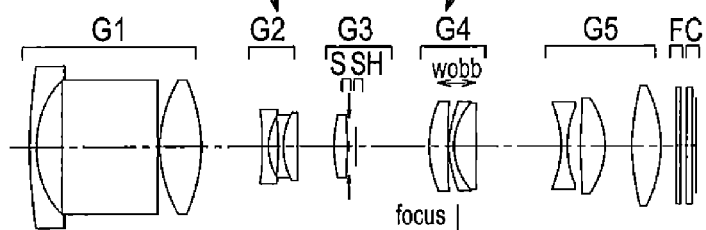
Figure 7D:
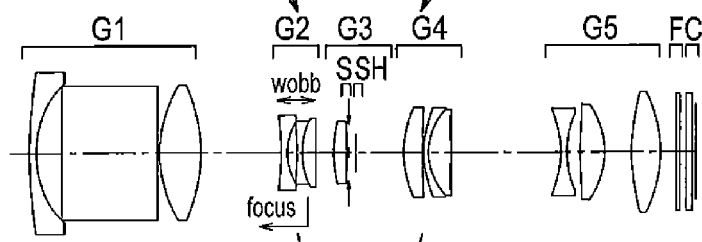
Figure 7E:
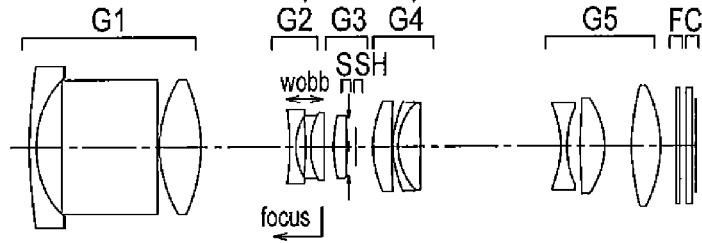

In the following, a second example (example of the zoom lens according to the second embodiment) will be described. FIGS. 7A, 7B, 7C, 7D, and 7E are cross sectional views of a zoom lens according to a second example taken along its optical axis, showing its configuration in the state in which the zoom lens is focused on an object point at infinity, where FIG. 7A shows the state at the wide angle end (W), FIG. 7B shows the state WS, FIG. 7C shows the state in an intermediate focal length state (S), FIG. 7D shows the state ST, and FIG. 7E shows the state at the telephoto end (T). The state WS is a state between the wide angle end and the intermediate focal length state. The state ST is a state between the intermediate focal length state and the telephoto end. In FIGS. 7A, 7B, 7C, 7D, and 7E, a first lens unit is denoted by G1, a second lens unit is denoted by G2, a third lens unit is denoted by G3, a fourth lens unit is denoted by G4, a fifth lens unit is denoted by G5, an aperture stop is denoted by S, a shutter blade is denoted by SH, a plane parallel plate constituting a low pass filter on which wavelength restriction coating for blocking or reducing infrared light is denoted by F, a plane parallel plate constituting a cover glass of an electronic image pickup element is denoted by C, and the image plane is denoted by I. Multilayer coating for wavelength restriction may be applied to the surface of the cover glass C. The cover glass C may be adapted to have a low pass filtering function. The plane parallel plate F may not have the function of low pass filter.

In the second example, the aperture stop S and the shutter blade SH are stationary as with the third lens unit G3. All the numerical data given below is for the state in which the zoom lens is focused on an object at infinity. In numerical data, lengths are in millimeters, and angles are in degrees. In the focal length range from the wide angle end to the intermediate focal length state including the state WS, focusing is performed by moving the fourth lens unit G4. In the focal length range above the intermediate focal length including the state ST and the telephoto end, focusing is performed by moving the second lens unit G2. Values in zoom data are given for the wide angle end (wide angle W), for the state WS, for the intermediate focal length state (intermediate S), for the state ST, and for the telephoto end (telephoto T).

As shown in FIGS. 7A, 7B, 7C, 7D, and 7E, the zoom lens according to second example includes, in order from the object side, a first lens unit G1 having a positive refractive power, a second lens unit G2 having a negative refractive power, a third lens unit G3 having a positive refractive power, an aperture stop S, a fourth lens unit G4 having a positive refractive power, and a fifth lens unit G5 having a positive refractive power.

During zooming from the wide angle end to the telephoto end, the first lens unit G1 is fixed, the second lens unit G2 moves toward the image side, the third lens unit G3 is fixed, the fourth lens unit G4 moves toward the object side, the fifth lens unit G5 is fixed, and the aperture stop S is fixed.

Figure 11:
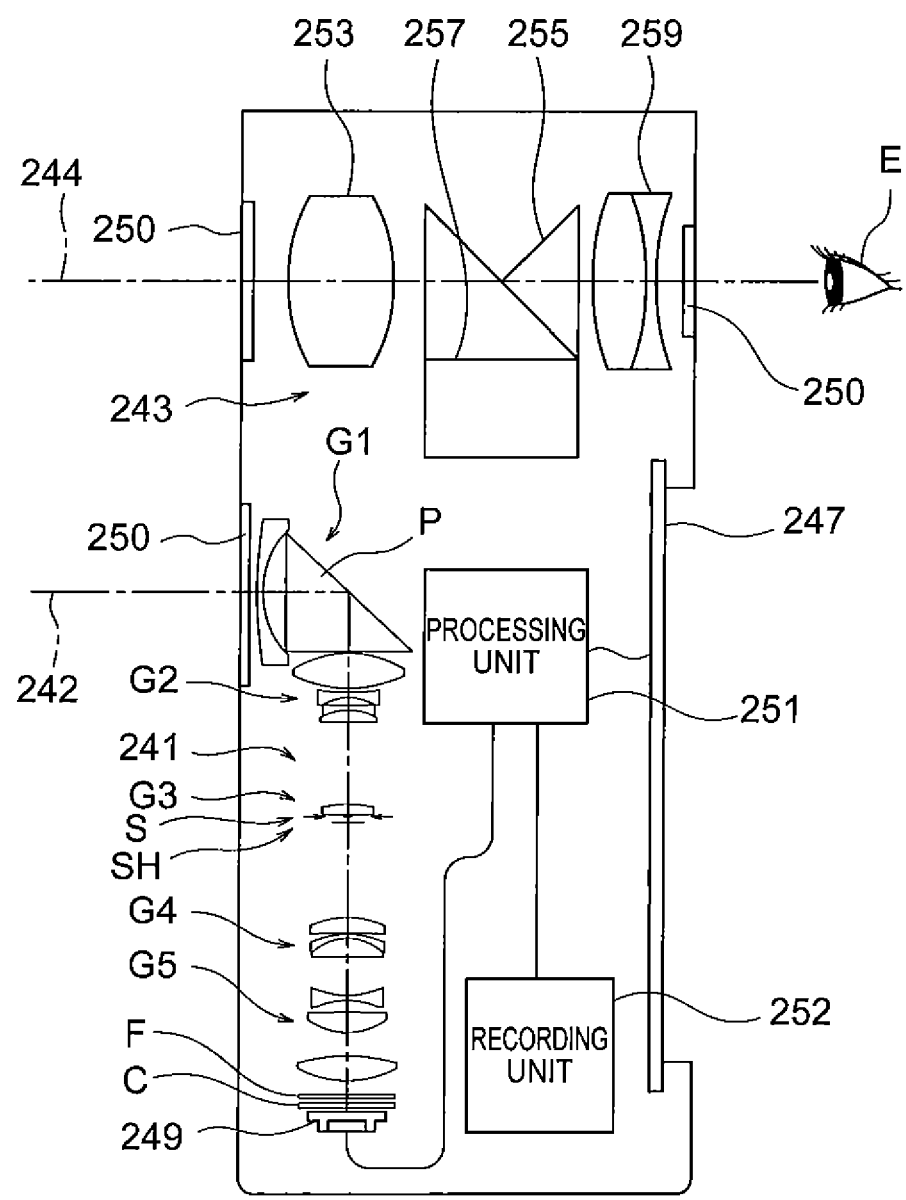
FIG. 11 is a cross sectional view of the digital camera shown in FIG. 9.

The first lens unit G1 is composed of a negative meniscus lens L1 having a convex surface directed toward the object side, a prism L2, and a biconvex positive lens L3. The second lens unit G2 is composed of a biconcave negative lens L4, and a cemented lens made up of a biconcave negative lens L5 and a biconvex positive lens L6. The third lens unit G3 is composed of a biconvex positive lens L7. The fourth lens unit G4 is composed of a positive meniscus lens L8 having a convex surface directed to the object side, and a cemented lens made up of a negative meniscus lens L9 having a convex surface directed toward the object side and a biconvex positive lens L10. The fifth lens unit G5 is composed of a biconcave negative lens L11, a biconvex positive lens L12, and a biconvex positive lens 13. The lenses in each lens unit are arranged in the mentioned order from the object side. FIGS. 7A, 7B, 7C, 7D, and 7E are a developed view in which the reflection surface in the prism L" is not illustrated. In reality, the prism L2 is a rectangular prism P as shown in FIG. 11.

There are ten aspheric surfaces, which include both surfaces of the biconvex positive lens L3, both surfaces of the biconcave negative lens L4, both surfaces of the biconvex positive lens L7, the object side surface of the positive meniscus lens L8, the image side surface of the biconvex positive lens L10, the object side surface of the biconvex positive lens L12, and the image side surface of the biconvex positive lens L13.

Numerical data of the second example described above is shown below. Symbols are described in a same way as those in the first example.

In a same manner as the first example, a shape of the aspheric surface is described by the following expression (I') using each aspherical surface coefficient in each embodiment, when Z is let to be a coordinate point on an optical axis, and Y is let to be a coordinate point on a direction orthogonal to the optical axis.

$$Z=(Y^2/r)/[1+\{1-(K+1)(Y/r)^2\}^{1/2}]+A_4Y^4+A_6Y^6+A_8Y^8+A_{10}Y^{10} \quad (I')$$

Example 2

Unit mm

Surface data

| Surface No | r | d | nd | vd |
|---|---|---|---|---|
| Object plane | ∞ | ∞ | | |
| 1 | 49.270 | 0.50 | 2.00069 | 25.46 |
| 2 | 8.237 | 2.10 | | |
| 3 | ∞ | 8.00 | 2.00100 | 29.13 |
| 4 | ∞ | 0.10 | | |
| 5* | 9.895 | 3.41 | 1.61881 | 63.85 |
| 6* | −12.887 | Variable | | |
| 7* | −19.165 | 0.50 | 1.80610 | 40.88 |
| 8* | 5.102 | 0.79 | | |

-continued

| | | Unit mm | | |
|---|---|---|---|---|
| 9 | −26.433 | 0.40 | 1.91082 | 35.25 |
| 10 | 6.564 | 1.23 | 1.94595 | 17.98 |
| 11 | −1062.418 | Variable | | |
| 12* | 10.529 | 1.10 | 1.58913 | 61.15 |
| 13* | −44.435 | 0.20 | | |
| 14(stop) | ∞ | 0.50 | | |
| 15(shutter blade) | ∞ | Variable | | |
| 16* | 9.519 | 1.56 | 1.74320 | 49.29 |
| 17 | 84.936 | 0.10 | | |
| 18 | 10.406 | 0.40 | 1.84666 | 23.78 |
| 19 | 5.600 | 1.83 | 1.49700 | 81.61 |
| 20* | −51.627 | Variable | | |
| 21 | −10.465 | 0.50 | 2.00100 | 29.13 |
| 22 | 9.267 | 1.09 | | |
| 23* | 29.867 | 1.96 | 1.52559 | 56.46 |
| 24 | −7.432 | 2.30 | | |
| 25 | 20.282 | 2.38 | 1.52559 | 56.46 |
| 26* | −12.248 | 1.38 | | |
| 27 | ∞ | 0.30 | 1.51633 | 64.14 |
| 28 | ∞ | 0.50 | | |
| 29 | ∞ | 0.50 | 1.51633 | 64.14 |
| 30 | ∞ | 0.34 | | |
| Image plane (Light receiving surface) | ∞ | | | |

| Aspherical surface data |
|---|

5th surface

K = 0.000
A4 = −1.84864e−04, A6 = −2.51369e−06, A8 = 3.91438e−08,
A10 = −7.99585e−10

6th surface

K = 0.000
A4 = 1.11128e−04, A6 = −8.90330e−07, A8 = 1.28139e−08,
A10 = −2.87130e−10

7th surface

K = 0.000
A4 = 1.67257e−03, A6 = −2.58404e−04, A8 = 1.66323e−05,
A10 = −1.74087e−07

8th surface

K = 0.000
A4 = 4.80905e−04, A6 = −1.79841e−04, A8 = −1.81965e−05,
A10 = 3.46709e−06

12th surface

K = 0.000
A4 = −3.63175e−04, A6 = 5.33825e−06, A8 = −5.92260e−06,
A10 = 6.17266e−07

13th surface

K = 0.000
A4 = −1.05329e−04, A6 = 8.78394e−07, A8 = −5.78559e−06,
A10 = 6.46718e−07

16th surface

K = 0.000
A4 = 3.11826e−05, A6 = −7.23581e−06, A8 = 6.91046e−07,
A10 = −1.84417e−08

20th surface

K = 0.000
A4 = 5.29426e−04, A6 = −1.84638e−05, A8 = 1.72774e−06,
A10 = −3.20625e−08

23th surface

K = 0.000
A4 = −3.54662e−04, A6 = −1.57258e−05, A8 = 7.05549e−07,
A10 = −4.42160e−08

-continued

| Unit mm |
|---|

26th surface

K = 0.000
A4 = 5.59723e−04, A6 = −4.24377e−05, A8 = 7.17096e−07,
A10 = −3.18623e−09

| Zoom ratio 4.80 Zoom data | | | | | |
|---|---|---|---|---|---|
| | Wide angle (W) | WS | Intermediate (S) | ST | Telephoto (T) |
| f(mm) | 3.91 | 5.79 | 8.57 | 12.69 | 18.78 |
| F NO. | 3.98 | 4.07 | 4.36 | 4.96 | 6.17 |
| 2ω(Angle of field) | 94.00 | 69.53 | 48.56 | 33.05 | 22.18 |
| fb (in air) | 2.75 | 2.75 | 2.75 | 2.75 | 2.75 |
| Lens total length (in air) | 54.97 | 54.97 | 54.97 | 54.97 | 54.97 |
| d6 | 0.41 | 3.17 | 5.24 | 6.70 | 7.59 |
| d11 | 7.73 | 4.97 | 2.90 | 1.44 | 0.55 |
| d15 | 9.19 | 7.72 | 6.05 | 4.07 | 1.50 |
| d20 | 3.67 | 5.14 | 6.81 | 8.79 | 11.36 |

| Unit focal length | | | | |
|---|---|---|---|---|
| f1 = 12.78 | f2 = −4.26 | f3 = 14.56 | f4 = 10.32 | f5 = 26.25 |

| Focusing Data | | | | | |
|---|---|---|---|---|---|
| | Wide angle (W) | WS | Intermediate (S) | ST | Telephoto (T) |
| Focus Unit | G4 | G4 | G4 | G2 | G2 |
| Shift Amount (Maximum Shift Amount) | 0.055 | 0.063 | 0.099 | 0.100 | 0.087 |

| Wobbling Data (At Infinity Focus, Full Aperture) Wobbling Amplitude | | | | | |
|---|---|---|---|---|---|
| | Wide angle (W) | WS | Intermediate (S) | ST | Telephoto (T) |
| Wobbling Lens Unit A | 0.002 | 0.003 | 0.006 | 0 (Stationary) | 0 (Stationary) |
| Wobbling Lens unit B | 0 (Stationary) | 0 (Stationary) | 0 (Stationary) | 0.006 | 0.005 |

| Focus Sensitivity (At Infinity Focus, Full Aperture) | | | | | |
|---|---|---|---|---|---|
| | Wide angle (W) | WS | Intermediate (S) | ST | Telephoto (T) |
| Wobbling Lens Unit A | 2.623 | 2.580 | 2.405 | 2.016 | 1.226 |
| Wobbling Lens Unit B | 1.171 | 1.675 | 2.458 | 3.779 | 6.401 |

| Values of Terms in Conditional Expressions |
|---|

|αAw| = 2.623
|αBw| = 1.171
|αAt| = 1.226
|αBt| = 6.401
MFw = 0.055
MAw = 0.002
MFt = 0.087
MBt = 0.005
fswitch = 8.57
fw = 3.91
ft = 18.78

Parameter and values of conditional expressions

|αAw|/|αBw|=2.240    conditional expression (1)

|αAt|/|αBt|=0.192    conditional expression (2)

|αBw|/|αAw|=0.446    conditional expression (3)

MFw/MAw=27.5    conditional expression (4)

MFt/MBt=17.4    conditional expression (5)

$|\alpha Bt|/|\alpha Bw|=5.221$ conditional expression (6)

$(f\text{switch}/fw)/(ft/fw)=0.456$ conditional expression (7)

(Digital Camera)

The image pickup apparatus according to the present invention that forms an image of an object by a zoom lens and picks up the image by receiving it by an electronic image pickup element such as a CCD can be applied to an electronic image pickup apparatus, in particular to a digital camera or a video camera. In the following, an embodiment of the electronic image pickup apparatus will be described.

Figure 9:
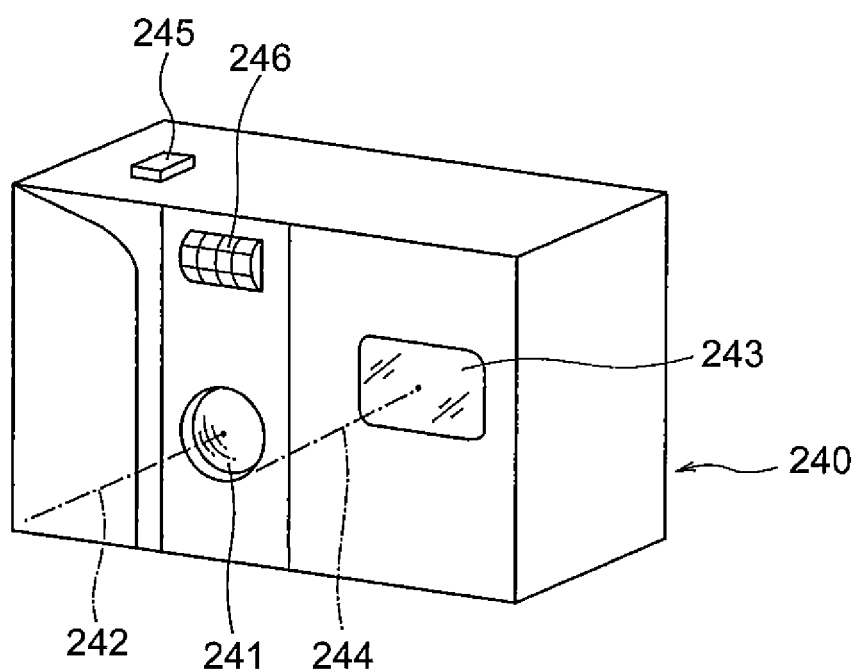
FIG. 9 is a front perspective view showing the outer appearance of a digital camera as an image pickup apparatus equipped with the zoom lens according to the second embodiment.
Figure 10:
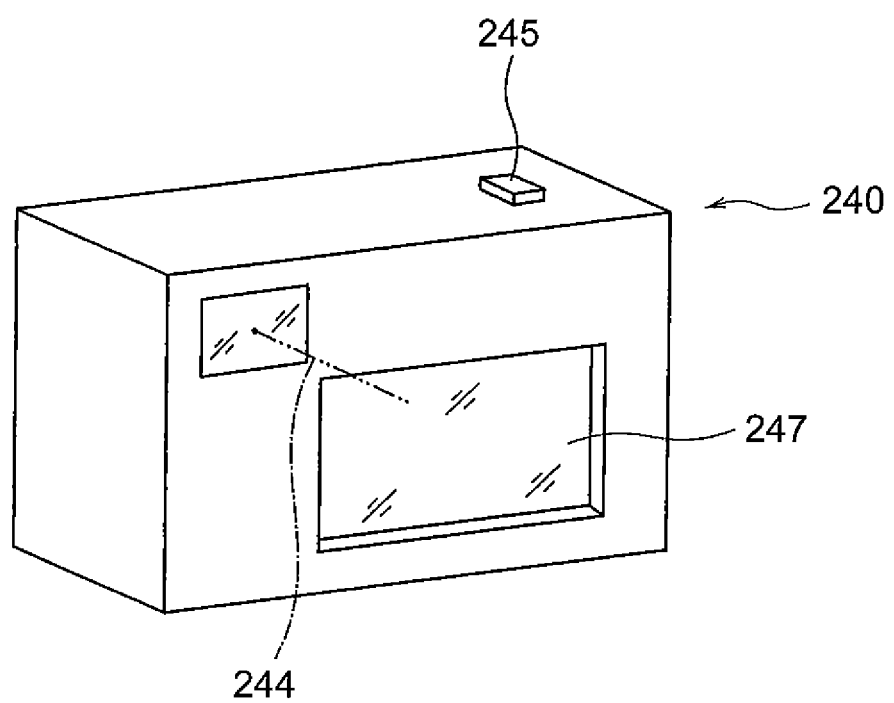
FIG. 10 is a rear perspective view of the digital camera shown in FIG. 9.

FIGS. 9 to 11 schematically illustrate a digital camera equipped with a zoom lens as a taking optical system 241 according to the present invention. FIG. 9 is a front perspective view showing the outer appearance of the digital camera 240. FIG. 10 is a rear perspective view of the digital camera 240. FIG. 11 is a cross section diagram of the digital camera 240. The digital camera 240 illustrated in the drawings has the taking optical system 241 having a taking optical path 242, a viewfinder optical system 243 having a viewfinder optical path 244, a shutter release button 245, a flash 246, and a liquid crystal display monitor 247. In response to depression of the shutter release button 245 provided on the top of the camera 240, shooting through the taking optical system 241, e.g. the zoom lens having a bent optical path according to the second embodiment, is effected. Specifically, an image of an object is formed by the taking optical system 241 on the image pickup surface of the CCD 249 through a near-infrared cut filter and an optical low pass filter F. The image of the object picked up by the CCD 249 is processed by a processing unit 251 and displayed as an electronic image on the liquid crystal display monitor 247 provided on the back of the camera. The processing unit 251 is connected with a recording unit 252, in which picked-up electronic images can be stored. The recording unit 252 may be provided separately from the processing unit 251. The recording unit 252 may be an electrically writable medium such as a flexible disk, memory card, or MO. A C-MOS sensor may be used in place of the CCD 249. The digital camera 240 may be constituted as a silver-halide camera provided with a silver film in place of the CCD 249.

A viewfinder objective optical system 253 is provided in the viewfinder optical path 244. An image of an object formed by the viewfinder objective optical system is formed in the viewfinder frame 257 of a Porro prism 255, which serves as an image erecting member. An eyepiece optical system 259 for delivering the erected image to the observer's eye E is provided in rear of the Porro prism 255. In addition, cover members 250 are provided at the entrance of the taking optical system 241, at the entrance of the viewfinder objective optical system, and at the exit of the eyepiece optical system respectively.

The taking optical system 241 of the digital camera 240 having the above-described construction is a zoom lens having a high zoom ratio of approximately 5 (five), high speed, and high optical performance. Therefore, an inexpensive, high-performance digital camera that is very slim in depth can be realized.

While the digital camera shown in FIG. 11 has a plane parallel plate as a cover member 250, it may be eliminated.

(Internal Circuit Configuration)

The internal circuit configuration of the relevant portion of the above-described digital camera 240 is the same as the internal circuit configuration of the first embodiment shown in FIG. 6 and will not be described in detail.

Both of the above-described first and second embodiments satisfy the following more preferred conditions.

In conditional expression (1), it is preferred that the lower limit be 1.67, more preferably 2.0.

In conditional expression (2), it is preferred that the upper limit be 0.8, more preferably 0.75.

In conditional expression (4), it is preferred that the lower limit be 10, more preferably 20.

In conditional expression (5), it is preferred that the lower limit be 10, more preferably 15.

In conditional expression (6), it is preferred that the lower limit be 5.

In conditional expression (7), it is preferred that the lower limit be 0.3.

In conditional expression (8), it is preferred that the upper limit be 0.6.

According to the present invention, there can be provided a zoom lens in which the load on the driving system for wobbling operation can easily made low. There can also be provided an image pickup apparatus equipped with such a zoom lens.

What is claimed is:

1. A zoom lens in which each of distances between a plurality of lens units changes during zooming from the wide angle end to the telephoto end, comprising:
   a focus lens unit that shifts along an optical axis to effect focusing from infinity to a close distance; and
   a plurality of wobbling lens units that wobble after a shift of the focus lens unit at an amplitude smaller than the shift of the focus lens unit in focusing operation,
   wherein the wobbling lens unit caused to operate is switched in the middle of the zooming from the wide angle end to the telephoto end.

2. An image pickup apparatus comprising a zoom lens according to claim 1 and an image pickup element arranged on the image side of the zoom lens to generate an electrical signal based on an optical image formed by the zoom lens.

3. A zoom lens according to claim 1, wherein at least one wobbling lens unit among the plurality of wobbling lens units also serves as the focus lens unit that shifts along the optical axis to effect focusing from infinity to a close distance.

4. A zoom lens according to claim 3, wherein
   at the wide angle end, wobbling operation is performed by the first wobbling lens unit A, and the second wobbling lens unit B is stationary while the first wobbling lens unit A is wobbling,
   at the telephoto end, wobbling operation is performed by the second wobbling lens unit B, and the first wobbling lens unit A is stationary while the second wobbling lens unit B is wobbling,
   the wobbling lens unit caused to wobble is switched over from the first wobbling lens unit A to the second wobbling lens unit B in the middle of zooming from the wide angle end to the telephoto end, and
   the zoom lens satisfies the following conditional expression (7):

$$0.2<(f_{switch}/f_w)/(f_t/f_w)<0.8 \quad (7),$$

where $f_{switch}$ is the upper limit of the range of focal length of the entire zoom lens system in which wobbling operation is performed using the first wobbling lens unit A, $f_w$ is the focal length of the entire zoom lens system at infinity focus at the wide angle end, and $f_t$ is the focal length of the entire zoom lens system at infinity focus at the telephoto end.

5. A zoom lens according to claim 1, wherein a first wobbling lens unit A among the plurality of wobbling lens units wobbles at the wide angle end, a second wobbling lens unit B among the plurality of wobbling lens units wobbles at the telephoto end, and the zoom lens satisfies the following conditional expressions (1) and (2):

$$|\alpha_{Aw}|/|\alpha_{Bw}|>1 \quad (1), \text{ and}$$

$$|\alpha_{At}|/|\alpha_{Bt}|<1 \quad (2),$$

where $\alpha_{Aw}$ is the focus sensitivity of the first wobbling lens unit A at infinity focus at the wide angle end, $\alpha_{Bw}$ is the focus sensitivity of the second wobbling lens unit B at infinity focus at the wide angle end, $\alpha_{At}$ is the focus sensitivity of the first wobbling lens unit A at infinity focus at the telephoto end, and $\alpha_{Bt}$ is the focus sensitivity of the second wobbling lens unit B at infinity focus at the telephoto end, the focus sensitivity $\alpha$ of the subject wobbling lens unit at infinity focus at the wide angle end and at the telephoto end being expressed by the following equation:

$$\alpha=(1-\beta_{wob}^2)\times\beta_r^2,$$

where $\beta_{wob}$ is the lateral magnification of the subject wobbling lens unit, and $\beta_r$ is the lateral magnification of the overall optical system on the image side of the subject wobbling lens unit.

6. A zoom lens according to claim 5, wherein the focus lens unit is a single focus lens unit that shifts along the optical axis to effect focusing from infinity to a close distance at both the wide angle end and the telephoto end.

7. A zoom lens according to claim 5, wherein the focus lens unit includes a first focus lens unit by which focusing from infinity to a close distance is performed at the wide angle end and a second focus lens unit by which focusing from infinity to a close distance is performed at the telephoto end, the first focus lens unit and the first wobbling lens unit A are the same, and the second focus lens unit and the second wobbling lens unit B are the same.

8. A zoom lens according to claim 5, wherein the first wobbling lens unit A and the second wobbling lens unit B satisfy the following conditional expression (3):

$$0\leq|\alpha_{Bw}|/|\alpha_{Aw}|<0.6 \quad (3).$$

9. A zoom lens according to claim 5, wherein the zoom lens satisfies the following conditional expression (4):

$$5<M_{Fw}/M_{Aw} \quad (4),$$

where $M_{Fw}$ is the maximum shift of the focus lens unit during the focusing operation from infinity to a close distance at the wide angle end, and $M_{Aw}$ is the maximum amplitude of wobbling of the first wobbling lens unit A at the time immediately after the zoom lens is focused at infinity at the wide angle end.

10. A zoom lens according to claim 5, wherein the zoom lens satisfies the following conditional expression (5):

$$5<M_{Ft}/M_{Bt} \quad (4),$$

where $M_{Ft}$ is the maximum shift of the focus lens unit during the focusing operation from infinity to a close distance at the telephoto end, and $M_{Bt}$ is the maximum amplitude of wobbling of the second wobbling lens unit B at the time immediately after the zoom lens is focused at infinity at the telephoto end.

11. A zoom lens according to claim 5, wherein the second wobbling lens unit B satisfies the following conditional expression (6):

$$4<|\alpha_{Bt}|/|\alpha_{Bw}| \quad (6).$$

12. A zoom lens according to claim 5, wherein the first wobbling lens unit A and the second wobbling lens unit B each include three or less lenses.

13. A zoom lens according to claim 12, wherein the first wobbling lens unit A and the second wobbling lens unit B each include two or less lenses.

14. A zoom lens according to claim 5, wherein the zoom lens includes a negative lens unit group having a negative refractive power and a positive lens unit group having a positive refractive power, which is arranged on the image side of the negative lens unit group, the negative lens unit group including the second wobbling lens unit B, and the positive lens unit group including the first wobbling lens unit A.

15. A zoom lens according to claim 14, wherein
the zoom lens includes a first lens unit having a positive refractive power, which is arranged on the object side of the negative lens unit group,
the positive lens unit group includes, in order from the object side, a third lens unit having a positive refractive power, a fourth lens unit having a positive refractive power, and a fifth lens unit having a positive refractive power, and
during zooming from the wide angle end to the telephoto end, the distance between the first lens unit and the negative lens unit group, the distance between the negative lens unit group and the third lens unit, the distance between the third lens unit and the fourth lens unit, and the distance between the fourth lens unit and the fifth lens unit change.

16. A zoom lens according to claim 15, wherein
the first lens unit, the third lens unit, and the fifth lens unit are stationary during zooming from the wide angle end to the telephoto end,
the negative lens unit group moves during zooming from the wide angle end to the telephoto end,
the fourth lens unit moves during zooming from the wide angle end to the telephoto end,
the second lens unit serves as the second wobbling lens unit B and a second focus lens unit,
the fourth lens unit serves as the first wobbling lens unit A and a first focus lens unit,
the first focus lens unit is the focus lens unit that performs focusing from infinity to a close distance at the wide angle end, and
the second focus lens unit is the focus lens unit that performs focusing from infinity to a close distance at the telephoto end.

17. A zoom lens according to claim 14, wherein
the zoom lens includes a first lens unit having a positive refractive power, which is arranged on the object side of the negative lens unit group,
the negative lens unit group includes, in order from the object side, a second lens unit having a negative refractive power and a third lens unit having a negative refractive power,
the positive lens unit group includes, in order from the object side, a fourth lens unit having a positive refractive power and a fifth lens unit having a positive refractive power, and
during zooming from the wide angle end to the telephoto end, the distance between the first lens unit and the second lens unit, the distance between the third lens unit and the fourth lens unit, and the distance between the fourth lens unit and the fifth lens unit change.

18. A zoom lens according to claim 17, wherein
the fifth lens unit includes, in order from the object side, an object side lens unit and an image side lens unit,
the third lens unit serves as the second wobbling lens unit B and the focus lens unit, and the object side lens unit in the fifth lens unit serves as the first wobbling lens unit A.

19. A zoom lens according to claim 18, wherein the distance between the second lens unit and the third lens unit changes during zooming from the wide angle end to the telephoto end.

20. A zoom lens in which each of distances between a plurality of lens units changes during zooming from the wide angle end to the telephoto end, comprising:
   a focus lens unit that shifts along an optical axis to effect focusing from infinity to a close distance; and
   a plurality of wobbling lens units that wobble after a shift of the focus lens unit at an amplitude smaller than the shift of the focus lens unit in focusing operation.

21. A zoom lens according to claim 20, wherein the wobbling lens unit caused to operate at the wide angle end and the wobbling lens unit caused to operate at the telephoto end are different from each other.

22. A zoom lens according to claim 20, wherein the wobbling lens unit caused to operate is switched changes in the middle of the zooming from the wide angle end to the telephoto end.

\* \* \* \* \*